3,419,991
PNEUMATIC DEVICE
Douglas W. Mitchell, Renfrew, Ontario, Canada, assignor of twenty-five percent to Donald J. Sullivan, Barryvale, Ontario, five percent each to Agnes Mitchell, Douglas S. Mitchell, and Pamela A. Mitchell, Renfrew, Ontario, and four percent to Donald E. Hewson, Streetsville, Ontario, Ontario, Canada
Filed Jan. 27, 1966, Ser. No. 523,414
U.S. Cl. 43—19          6 Claims
Int. Cl. A01k 91/02

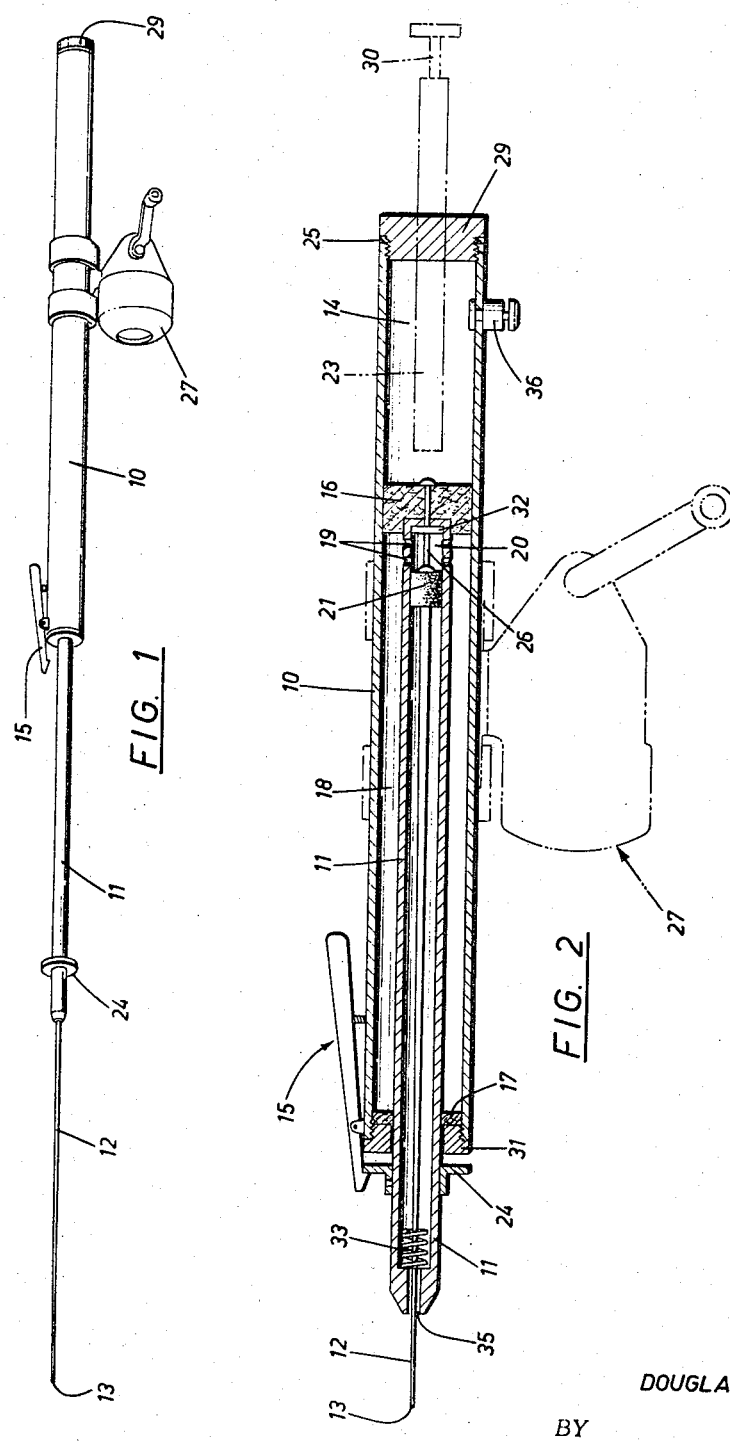
Jan. 7, 1969   D. W. MITCHELL   3,419,991
PNEUMATIC DEVICE
Filed Jan. 27, 1966
INVENTOR.
DOUGLAS W. MITCHELL
BY
Douglas S. Johnson
Attorney

United States Patent Office 3,419,991
Patented Jan. 7, 1969

ABSTRACT OF THE DISCLOSURE

A pneumatic casting device provided with a first tubular member closed at one end and partially sealed at its other end. A second tubular member is provided with a plunger at one end and apertures adjacent thereto and is slidably received in the first member. A rod member is provided with a plunger at one end and is slidably received in the second member. A stop rod extends inwardly of the second member from its plunger beyond the apertures to prevent the plunger on the rod member from blocking the apertures. A gas under pressure is introduced into the first member between its closed end and the plunger of the second member. A releasable latch is mounted on the first and second members to prevent relative movement of the same when gas pressure is applied.

---

This invention relates to pneumatic devices, and more particularly, to pneumatic devices having a plurality of movable extensive members. The device is particularly contemplated as a fishing plug casting device, or in more general terms, a bait caster.

The pneumatic bait caster of this invention employs the principle of a piston moving within a cylinder under pneumatic pressure; and when constructed with two movable extensive members, a double acceleration is imparted to the second member.

The sport of fishing is practiced and enjoyed by a very large percentage of the population. Of those persons known as fishermen, many practice that form of fishing known as casting. In particular, many fishermen cast from docks or wharfs, in fast flowing streams, from boats, and into surf, to state but a few examples. In many circumstances, a fisherman casting bait is required to have considerable control and accuracy in the placement of the bait at the water surface. Further, circumstances sometime require casting a bait for a considerable distance.

Many fishermen have been known, when casting bait using a normal casting rod requiring a reciprocal whipping action of the hand and arm, to release the line attached to the bait too soon. This may result in tangling the line and bait into overhanging trees, or in extreme cases, catching their own person on the fishing hooks attached to the bait. It has further been known when using certain types of reels and too hard an action, to achieve backlash in which the line winds backward on the reel or tangles in the line guides attached to a standard casting rod.

This invention contemplates a casting device which requires no reciprocal whipping motion of the hand and arm to cast the bait; but which may be so used if desired.

It is an object of this invention to provide a pneumatic device suitable as a bait caster from which the bait or plug is catapulted from the end of the device and which operates under pneumatic pressure.

It is a further object of this invention to provide a bait caster which is simple in construction and operation, but which provides accuracy in casting bait at the surface of water and which provides casts of considerable distance.

These and other objects and advantages of the invention will be discussed in relation with the drawings in which:

FIGURE 1 illustrates the bait caster in extended form; and,

FIGURE 2 illustrates the bait caster in cross-sectional form, and including an auxiliary pump; and in its collapsed or compacted position.

The bait caster comprises basically an outer cylindrical shell 10, an inner cylindrical tube 11 and an axial rod 12. In addition, a trigger mechanism 15 is provided to release the bait casting device, as will be discussed; and a reel 27 of any suitable design such as a spinning reel is provided to hold the line attached to the fishing bait which will be catapulted from the bait caster.

Outer cylindrical shell 10 is essentially a tube having the requisite dimensions to have fitted within it tube 11 and, within that, rod 12. In addition, cylindrical shell 10 will be of sufficient length to allow movement of tube 11 within it, as discussed below; and must be of sufficient strength to withstand the internal pressures which are built up when the casting device is in operation. The cylindrical shell 10 may conveniently be made of light-weight metals such as aluminum or magnesium alloys, steels such as high tensile or stainless steel, or high strength plastics such as moulded polyesters, high strength polystyrene and melamines.

An auxiliary air pump 23 may be fitted into the end of cylindrical shell 10 by such means as threaded sleeve 29. A seal 25 is fitted to provide the required pressure seal between cylindrical shell 10 and sleeve 29. The pump operates in the usual manner by applying a pumping action to pump stem 30. Pump 23 is an auxiliary pump and is only used when additional pressure may be required. Alternatively, as shown in FIGURE 1, the pump may be deleted from the bait caster without affecting the operation of the device. In that event, the seal 25 will fit between shell 10 and sleeve 29.

Tube 11 is fitted within cylindrical shell 10 and is movable longitudinally within shell 10. A plunger 16 is provided at the end of tube 11, and moves with tube 11 in sliding relationship to the inner surface of shell 10. The plunger 16 co-acts with the inner surface of shell 10 to provide an air seal; and a first pressure chamber 14 is defined within cylindrical shell 10 and between plunger 16 and seal 25. When no auxiliary pump 23 is included in the structure of the bait caster, as shown in FIGURE 1, first pressure chamber 14 is still defined between plunger 16 and seal 25 at sleeve 29; or if the end of shell 10 is closed by other than the sleeve 29 such as by a welded piece, the pressure chamber is between the end of shell 10 and plunger 16.

At the opposite end of tube 11 from plunger 16, the tube is attached in any convenient manner to an end piece 24. End piece 24 is so designed as to provide a finger-hold for withdrawing tube 11 into shell 10. In addition, as illustrated in the drawing, trigger mechanism 15 may be so designed as to co-act with end piece 24 in such a manner that release of the trigger mechanism 15 will initiate operation of the bait caster.

The material of tube 11 may conveniently be the same as that of cylindrical shell 10, viz. light-weight metals such as aluminum or magnesium alloys, steels such as high tensile or stainless steel, or high strength plastics such as moulded polyesters, high strength polystyrene and melamines.

Cap member 31 is attached to cylindrical shell 10 by any convenient means such as by threading into the interior of shell 10, and a seal member 17 is provided adjacent to cap member 31 within the interior of shell 10. Seal member 17 serves as a loose fitting or partial pressure seal, and is so designed together with cap member 31 that, under normal conditions when the bait caster is at rest as shown in the FIGURE 2, atmospheric pressure may communicate to a second pressure chamber 18 within cylindrical shell 10. Second pressure chamber 18 is defined between seal member 17 and plunger 16, and within shell 10, but outside tube 11.

There is also provided a communication between second pressure chamber 18 and a third pressure chamber 20 through holes 19 provided in the wall of tube 11 at the end nearest plunger 16. Third pressure chamber 20 is defined between a plunger 21 attached to the end of rod 12 and a seal 32 at the end of tube 11 and within tube 11. Stop member 26 is provided within third pressure chamber 20 and is suitably comprised of a pin having sufficient length as to prevent withdrawal of plunger 21 within tube 11 to an extent that holes 19 would be covered up. Stop member 26 therefore assures that third pressure chamber 20 will communicate with second pressure chamber 18 by means of holes 19.

At the end of tube 11 opposite the plunger 16 a compression member such as spring member 33 is fitted within tube 11 and around rod 12. Spring member 33 is conveniently attached to the end of tube 11. A hole 35 is provided within the end of tube 11 of such a diameter that rod 12 may move through the hole, and through spring member 33, unimpeded. Rod 12 fits within the interior of tube 11 and extends beyond its end so that the end 13 of rod 12 presents sufficient locating space that a plug or bait may be fitted over end 13 without becoming jammed on the end of tube 11. Rod 12 suitably comprises a light-weight material, for example; light-weight metal alloys such as magnesium or aluminum, glass fibre, nylon, or other suitable materials. When a plug or bait is fitted over end 13 of rod 12, a fishing line will be attached from the plug or bait to reel 27 in any convenient manner.

Auxiliary pump 23 may also be replaced, if desired, by a compressed gas cartridge such as a $CO_2$ cartridge which would be fitted in a convenient manner to cylindrical shell 10 in order to communicate with first pressure chamber 14. In addition, a pressure release valve 36 is provided which, when operated, communicates first pressure chamber 14 to the outside of the device.

Plungers 16 and 21 and seals 17, 25 and 32 may comprise any suitable material such as rubber, leather, nylon, or other plastics. End piece 24 may be made of such materials as light-weight metal alloys, plastics, and steel. It must have sufficient strength to co-act with trigger mechanism 15 for release of the device, and to hold tube 11 in against the pressure in first pressure chamber 14.

The operation of the pneumatic bait casting device of this invention is as follows. Assume that the bait caster is in its fully extended position, as illustrated in FIGURE 1; that is, plunger 16 is abutting against seal 17, and plunger 21 is against spring member 33. The fully extended position may be considered the starting position, and will be that position which the bait caster assumes after it has been operated.

End piece 24 is grasped and moved towards shell 10 so that tube 11 is brought into the shell. As tube 11 moves into shell 10, air is compressed between plunger 16 and seal 25 in first pressure chamber 14. Because seal 17 is a partial seal which is reasonably tightly fitting, a vacuum tends to occur in second pressure chamber 18 due to the motion of plunger 16 away from seal 17. This vacuum, of course, communicates with third pressure chamber 20 and tends to draw rod 12 back into tube 11. Thus, by merely pulling tube 11 into shell 10, rod 12 is also withdrawn backwards into tube 11, and the bait caster assumes its compacted or collapsed position illustrated in FIGURE 2.

As mentioned, compressed air is now contained within first pressure chamber 14. As the bait caster sits in its rest position for a moment (say, while the plug or bait is applied over end 13), atmospheric pressure communicates through the partial seal 17, or past rod 12 and plunger 21 through holes 19, to second pressure chamber 18 and third pressure chamber 20. Thus, after a moment, atmospheric pressure is attained in second and third pressure chambers 18 and 20, while compressed air remains in first pressure chamber 14. If it is desired, and if auxiliary pump 23 or a $CO_2$ cartridge is provided, additional pressure may be built up within first pressure chamber 14.

To operate the bait caster, trigger 15 is released. When the trigger mechanism is released, tube 11 in concert with rod 12, move forward within shell 10 under the action of the compressed air contained in first pressure chamber 14. Both tube 11 and rod 12 attain the same acceleration and will have the same velocity as plunger 16 approaches seal 17. As plunger 16 abuts against seal 17, the forward momentum of rod 12 moving with tube 11 carries the rod out of tube 11. Additionally, however, as tube 11 moves forward within shell 10, the air contained in second pressure chamber 18 is compressed between seal 17 and plunger 16. The pressure thus attained in second pressure chamber 18 communicates with third pressure chamber 20; and as the forward motion of tube 11 is stopped by the interaction of plunger 16 against seal 17, the pressure within chamber 20 imparts additional acceleration to rod 12. A second acceleration is thereby imparted to rod 12, both from its action of moving forward with tube 11 and from the pressure in chamber 20, and rod 12 moves out of tube 11 with an even greater velocity.

As rod 12 approaches the extent of its forward travel, plunger 21 begins contact with spring member 33, and the spring member is slightly compressed. The momentum of the rod is therefore imparted to the bait or plug fitting over end 13 as the forward motion of the rod is arrested by the spring member 33 and the bait is catapulted from the end of the rod.

It will be apparent that the fisherman using the bait casting device of the present invention, by properly choosing elevation and azimuth of the device, and by the optional addition of the pressure into first pressure chamber 14, may accurately control the placing and distance of the bait that will be catapulted from the device. It will also be apparent that with appropriate modifications, the device may be so designed that rod 12 may be in itself completely ejected from the caster. In this case, rod 12 would be suitably replaced by a spear or arrow; but would in any event operate under the impartation of a second acceleration as discussed above.

It will also be apparent that considerable control by the user may be obtained, and that good casting distance is attainable due to the action of the tube 11 and rod 12 both moving forward in the same direction. Casting distances of up to sixty or eighty feet are commonplace using the bait caster of the present invention, and casting distances of over one hundred feet can be attained.

By way of example only, and not in any way limitative to the present invention, bait casters have been constructed having an overall compacted length of approximately three feet, excluding the auxiliary pump, and weighing approximately twelve ounces. Casting distances greater than sixty feet have been attained without using the auxiliary pump.

The plug or bait to be catapulted from the bait caster may be of any suitable design or weight, according to the wishes of the user and the type of fish intended to be caught. The only consideration is that the design of the bait or plug be such that it will fit loosely over the end 13 of rod 12, so that it will not constrict and may be easily catapulted. The selection of reel 27 is also one of personal choice, but preferably, the reel should be of a type in which backlash and line drag are not inherent, such as a spinning reel. In addition, it should be noted that for particular circumstances, a bait caster having more than three sections (say, four or five), may be constructed according to the same principles as discussed above.

Operation of pressure release valve 36 communicates first pressure chamber 14 with atmospheric pressure outside the device. After the last casting operation, or at any other time, the bait caster is brought into its collapsed or compacted position; and, as described above, pressure is built up in first pressure chamber 14. It is necessary to release that pressure if the bait caster is to be put down, or carried, in order to avoid inadvertent release of the trigger mechanism and the subsequent extension of tube 11 and rod 12 out of the shell.

It is also possible to use the bait caster in a conventional manner, i.e. to cast the bait from the end 13 of rod 12 when the caster is in its extended position using a reciprocal whipping motion of the hand and arm. Also, of course, if a strike is made after operation of the device, the flexibility of rod 12 is sufficient to play the fish in order to successfully complete the catch.

Trigger mechanism 15 may conveniently be arranged along with a reel release on reel 27 so that both may operate simultaneously. By so arranging the trigger and reel release, the line does not play off the reel until it is pulled by the forward motion of the bait at the end of the rod 12. It is obivous that the reel must be released before or at the time the trigger is operated in order to prevent line breakage.

In the operation of the device, pressures upwards of 200 p.s.i. may be developed. It is also possible that the pressure in the second pressure chamber 18 may be higher than that developed in first pressure chamber 14; so that tube 11 must have sufficient strength to withstand the crushing pressure developed in pressure chamber 18. Assuming a pressure $P_1$ in first pressure chamber 14, and cross sectional areas $A_1$ and $A_2$ for the first and second pressure chambers 14 and 18 respectively, pressure $P_2$ developed in pressure chamber 18 as plunger 16 moves forward may be in the order of $$P_1 \times \frac{A_1}{A_2}$$

If the cross sectional area $A_2$ is less than $A_1$, pressure $P_2$ may exceed pressure $P_1$. Keeping in mind the high pressures developed in the device, and providing for a reasonable margin of safety, with a factor of five or better, samples of the device have been designed of materials having a yield point of better than 1100 p.s.i.

It is apparent that the principle of the second acceleration inherent on the second movable member of this device may, as indicated above, be applied to a projectile such as a spear or arrow which can be completely expelled from the device. Also, with appropriate modifications, the pneumatic device of the present invention may be employed as a bullet firing device from which muzzle velocities in the order of 1000 f.p.s. can be obtained. Also, with appropriate modifications to the device for supplying compresed air to the first pressure chamber 14, the device may be employed as a ramset gun to provide for firing studs or other material into rock and concrete. Again, with appropriate dimensions and trigger mechanisms, the principle of a second acceleration in the pneumatic device of the present invention may be used to deploy such things as antennae on space capsules.

The embodiments of the invention in which an exclusive property or privilege is claimed are defined as follows:

1. A pneumatic bait casting device comprising:
   an outer cylindrical shell;
   an inner cylindrical tube, and a rod;
   said rod extendibly fitting within said inner cylindrical tube and extending from a first end thereof, and said inner cylindrical tube extendibly fitting within said outer cylindrical shell and extending from a first end thereof;
   a first plunger attached to a second end of said tube, opposite said first end of said tube, and a second plunger attached to the end of said rod opposite said end extending beyond said first end of said tube;
   a first pressure chamber defined within said cylindrical shell between said first plunger and a second end of said cylindrical shell opposite said first end;
   a second pressure chamber defined within said cylindrical shell outside said inner cylindrical tube and between said first plunger and said first end of said cylindrical shell;
   a third pressure chamber within said tube and between said second plunger and said second end of said tube, and means communicating said second pressure chamber to said third pressure chamber;
   trigger means at said first end of said outer cylindrical shell co-acting with said first end of said tube;
   stop means extending into said third pressure chamber within said tube from said second end of said tube beyond said means communicating said second and third pressure chambers;
   compression means within said tube at said first end of said tube;
   partial seal means about said tube within said shell at said first end of said shell;
   and, reel means supported by said outer cylindrical shell.

2. The pneumatic bait casting device of claim 1, including an auxiliary pump communicating with said first pressure chamber at said second end of said outer cylindrical shell.

3. The pneumatic bait casting device of claim 1, including a compressed gas cartridge communicating with said first pressure chamber at said second end of said outer cylindrical shell.

4. A pneumatic fishing device comprising:
   a first cylindrical member having first and second ends;
   a second cylindrical member having first and second ends with a portion thereof extendibly fitting within said first cylindrical member and a portion extending from the second end thereof;
   a third member having first and second ends with a portion thereof extendibly fitting within said second member and a portion extending from the second end thereof;
   a first plunger attached to said first end of said second member;
   a second plunger attached to said first end of said third member;
   a first pressure chamber defined within said first member between said first plunger and the first end of said first member;
   a second pressure chamber defined within said first member outside said second member and between said first plunger and said second end of said first member;
   a third pressure chamber defined within said second member and between said second plunger and said first end of said second member;
   means communicating said second pressure chamber to said third pressure chamber;
   trigger means at said second end of said first member co-acting with said second end of said second member;
   stop means extending into said third pressure chamber from said first end of said second member beyond said means communicating said second and third pressure chambers;
   compression means within said second member at said second end;
   and, partial seal means within said first member about said second member at said second end of said first member.

5. The pneumatic device as claimed in claim 4, including an auxiliary pump communicating with said first pressure chamber at said first end of said first member.

6. The pneumatic device as claimed in claim 4, including a compressed gas cartridge, communicating with said first pressure chamber at said first end of said first member.

References Cited

UNITED STATES PATENTS

| | | | |
|---|---|---|---|
| 2,217,820 | 10/1940 | Rowe | 43—19 |
| 2,605,569 | 8/1952 | Kronhaus et al. | 43—19 |
| 2,671,289 | 3/1954 | McCullough | 43—19 |
| 2,717,466 | 9/1955 | Andre | 43—6 |
| 2,864,197 | 12/1958 | Johnson | 43—19 |
| 2,977,706 | 4/1961 | Merz | 43—19 |

WARNER H. CAMP, *Primary Examiner.*

U.S. Cl. X.R.

43—6